(12) United States Patent
Eischeid et al.

(10) Patent No.: US 8,924,883 B2
(45) Date of Patent: Dec. 30, 2014

(54) CONTENT PRESENTATION UTILIZING MOVEABLE FLY-OVER ON-DEMAND USER INTERFACES

(75) Inventors: Todd M. Eischeid, Cary, NC (US); John P. Franks, Cary, NC (US); Mark E. Molander, Cary, NC (US); Michael H. Nolterieke, Raleigh, NC (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 415 days.

(21) Appl. No.: 12/892,738

(22) Filed: Sep. 28, 2010

(65) Prior Publication Data

US 2012/0079414 A1 Mar. 29, 2012

(51) Int. Cl.
G06F 3/048 (2013.01)
G06F 3/0481 (2013.01)

(52) U.S. Cl.
CPC .... *G06F 3/0481* (2013.01); *G06F 2203/04801* (2013.01); *G06F 2203/04805* (2013.01)
USPC .......................................................... 715/781

(58) Field of Classification Search
USPC ........................................................ 715/781
See application file for complete search history.

(56) References Cited

U.S. PATENT DOCUMENTS

| | | | |
|---|---|---|---|
| 6,072,484 A * | 6/2000 | Kuroda ......................... | 715/799 |
| 6,091,395 A * | 7/2000 | DeStefano .................... | 715/862 |
| 6,181,338 B1 | 1/2001 | Brodhun | |
| 6,219,679 B1 * | 4/2001 | Brisebois et al. ............. | 715/206 |
| 6,654,035 B1 | 11/2003 | DeStefano | |
| 6,717,600 B2 * | 4/2004 | Dutta et al. ................... | 715/862 |
| 7,176,943 B2 | 2/2007 | Meyers et al. | |
| 2004/0027381 A1 * | 2/2004 | Jaeger .......................... | 345/764 |
| 2005/0020238 A1 * | 1/2005 | Eastman et al. .............. | 455/403 |
| 2005/0125742 A1 | 6/2005 | Grotjohn et al. | |
| 2007/0097150 A1 * | 5/2007 | Ivashin et al. ................ | 345/660 |
| 2007/0136686 A1 * | 6/2007 | Price et al. ................... | 715/808 |
| 2007/0162868 A1 | 7/2007 | Vignet | |
| 2007/0176906 A1 * | 8/2007 | Warren ......................... | 345/173 |
| 2008/0128182 A1 * | 6/2008 | Westerman et al. ....... | 178/18.06 |
| 2009/0094553 A1 * | 4/2009 | Karstens ....................... | 715/810 |

(Continued)

FOREIGN PATENT DOCUMENTS

KR 10-2008-032391 A 4/2008

OTHER PUBLICATIONS

Molander, Mark et al., "Progressive Flyover Popups for Displaying Varying Levels of Information Associated with User Interface Elements", Jul. 22, 2010, pp. 1-4, Doc. No. IPCOM00197942D, ip.com, United States.

*Primary Examiner* — Omar Abdul-Ali
*Assistant Examiner* — Haimei Jiang (57) ABSTRACT

Content presentation using on-demand user interfaces is provided. One embodiment comprises detecting position of a pointer by a user relative to a content element in a graphical user interface displayed on an electronic display screen; displaying a popup window at a location on the graphical user interface while the pointer hovers over the content element, wherein the popup window includes a bump zone indicating that the popup window is moveable; detecting proximity of the pointer relative to the bump zone while the pointer hovers over the content element; and transitioning the popup window to a new location on the graphical user interface based on the detected proximity and movement of the pointer relative to the bump zone.

20 Claims, 8 Drawing Sheets

(56) References Cited

U.S. PATENT DOCUMENTS

| | | |
|---|---|---|
| 2009/0119617 A1 | 5/2009 | Colussi et al. |
| 2009/0237372 A1* | 9/2009 | Kim et al. ............ 345/173 |
| 2009/0327964 A1* | 12/2009 | Mouilleseaux et al. ...... 715/834 |
| 2010/0100842 A1* | 4/2010 | Kim ............ 715/808 |
| 2010/0245281 A1* | 9/2010 | Janik ............ 345/173 |
| 2010/0306710 A1* | 12/2010 | Poot ............ 715/856 |
| 2010/0318926 A1* | 12/2010 | Anderson et al. ............ 715/763 |
| 2011/0252380 A1* | 10/2011 | Chaudhri ............ 715/836 |
| 2012/0017146 A1* | 1/2012 | Travieso et al. ............ 715/265 |
| 2012/0017182 A1* | 1/2012 | Bau ............ 715/859 |
| 2012/0036460 A1* | 2/2012 | Cieplinski et al. ............ 715/769 |

* cited by examiner

CONTENT PRESENTATION UTILIZING MOVEABLE FLY-OVER ON-DEMAND USER INTERFACES

BACKGROUND OF THE INVENTION

1. Field of the Invention

The present invention relates generally to content presentation and in particular to content presentation using on-demand user interfaces.

2. Background Information

In graphical user interfaces, on-demand user interface components such as flyover popups can be a very direct and simple way to see additional details on an element in a user interface. A flyover popup is a windowed screen area that is displayed while a pointer hovers over a designated screen area.

The trend in using immediate on-demand user interfaces provides an enriching experience for displaying useful information. However, immediate on-demand user interfaces such as flyover popups typically overlay and cover from view portions of the user interface which the user may not want covered.

BRIEF SUMMARY OF THE INVENTION

Embodiments of the invention provide content presentation using on-demand user interfaces. One embodiment comprises a method for providing content presentation comprising detecting the position of a pointer by a user relative to a content element in a graphical user interface displayed on an electronic display screen; displaying a popup window at a location on the graphical user interface while the pointer hovers over the content element, wherein the popup window includes a bump zone indicating that the popup window is moveable; detecting the proximity of the pointer relative to the bump zone while the pointer hovers over the content element; and transitioning the popup window to a new location on the graphical user interface based on the detected proximity of the pointer relative to the bump zone.

Another embodiment comprises a computer program product for content presentation on an electronic display, comprising a computer usable medium having computer readable program code embodied therewith, wherein the computer readable program code when executed on the computer causes the computer to perform operations comprising detecting position of a pointer by a user relative to a content element in a graphical user interface displayed on an electronic display screen. The computer operations further comprise displaying a popup window at a location on the graphical user interface while the pointer hovers over the content element, wherein the popup window includes a bump zone indicating that the popup window is moveable, detecting proximity of the pointer relative to the bump zone while the pointer hovers over the content element, and transitioning the popup window to a new location on the graphical user interface based on the detected proximity of the pointer relative to the bump zone.

Another embodiment comprises system for content presentation on an electronic display, comprising a user interface control processor configured for detecting position of a pointer by a user relative to a content element in a graphical user interface displayed on an electronic display screen, displaying a popup window at a location on the graphical user interface while the pointer hovers over the content element, wherein the popup window includes a bump zone indicating that the popup window is moveable, detecting proximity of the pointer relative to the bump zone while the pointer hovers over the content element, and transitioning the popup window to a new location on the graphical user interface based on the detected proximity of the pointer relative to the bump zone.

Other aspects and advantages of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

For a fuller understanding of the nature and advantages of the invention, as well as a preferred mode of use, reference should be made to the following detailed description read in conjunction with the accompanying drawings, in which.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification, as well as meanings understood by those skilled in the art and/or as defined in dictionaries, treatises, etc. The description may disclose several preferred embodiments for content presentation, as well as operation and/or component parts thereof. While the following description will be described in terms of content presentation systems and processes for clarity and placing the invention in context, it should be kept in mind that the teachings herein may have broad application to all types of systems, devices and applications.

Embodiments of the invention allow a user (operator) of a graphical user interface displayed on an electronic display screen, to use a pointer to manipulate how the content is presented by the graphical user interface. In one implementation, as the user places or moves the pointer on the graphical user interface, the position of the pointer relative to a content element in the graphical user interface is detected. When the pointer hovers over the content element, a popup window is displayed at a location on the graphical user interface. The popup window includes a bump zone indicating that the popup window is moveable. As the user moves the pointer relative to the popup widow (with the pointer still hovering over the content element), proximity of the pointer relative to the bump zone is determined. Based on the detected proximity of the pointer relative to the bump zone the popup window is selectively transitioned to a new location on the graphical user interface. For example, if the user moves the pointer sufficiently close to the bump zone, the popup window is selectively transitioned (e.g., moved) to a new location on the graphical user interface.

Figure 1:
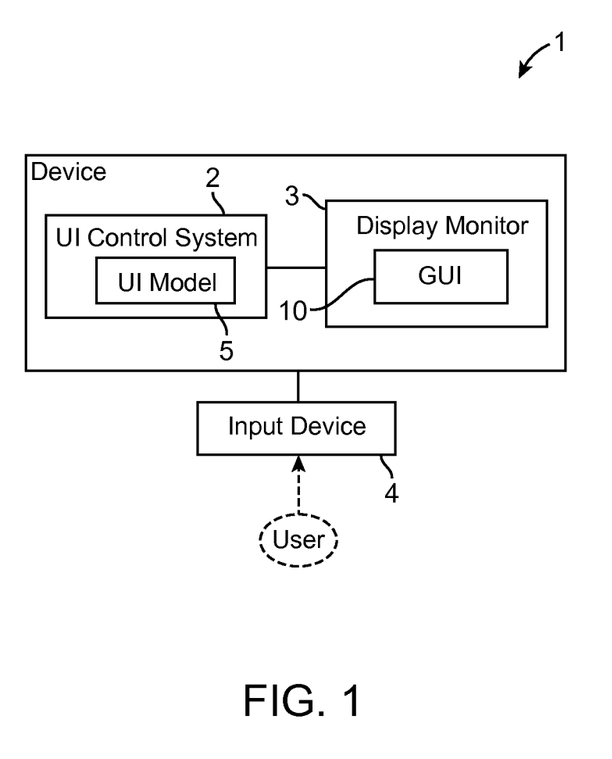
FIG. 1 illustrates a system for content presentation using on-demand user interfaces, according to one embodiment of the invention.

In one embodiment, the present invention provides content presentation using on-demand user interfaces. Referring to FIG. 1, an information technology system 1, according to an embodiment of the invention, includes a user interface (UI) control system 2 providing multimedia content presentation in a graphical user interface (GUI) 10 on an electronic display monitor 3 using an on-demand user interface comprising flyover popups. The UI control system 2 controls the on-demand user interfaces in the GUI 10 based on user input via an input device such as a pointing device (e.g., mouse) 4. In one embodiment, the UI control system 2 includes a UI model 5 including factors which dictates the behavior of the flyover popup in general, and in particular in response to user inputs via a pointer. In one embodiment, the UI model 5 may comprise a look-up table or programming of factors which dictate a behavior for the flyover popup for each of a number of factors (e.g., user input, pointer motion, pointer location), as described further below. The factors of the UI model 5 may be updated/modified as desired for various desired behaviors.

Figure 2:
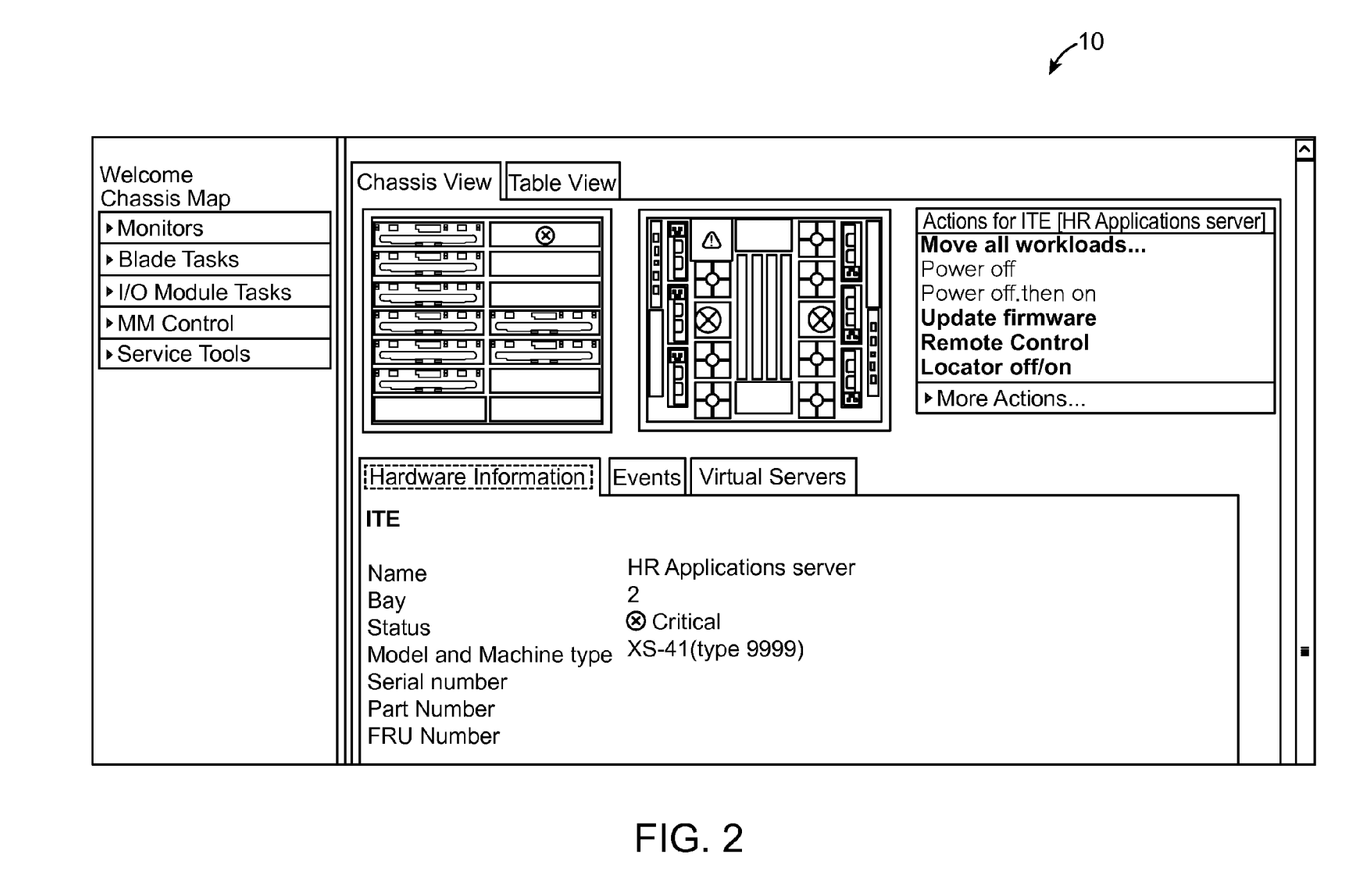
FIG. 2 illustrates a content presentation user interface, according to one embodiment of the invention.
Figure 8:
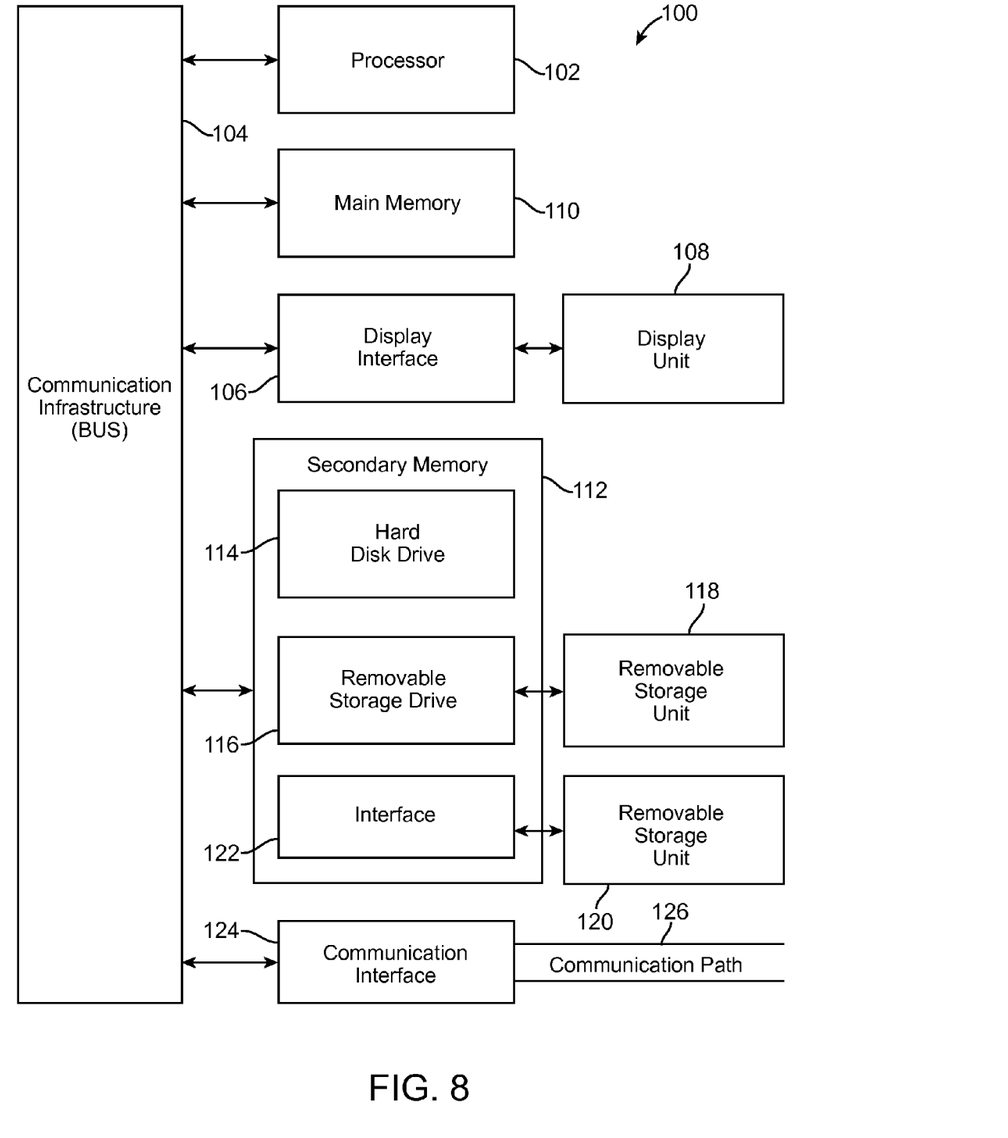
FIG. 8 illustrates a high level block diagram of an information processing system useful for implementing one embodiment of the invention.

One example application of an embodiment of the invention is in UI design for systems such as a monitoring system that display system information on an electronic display for hardware systems. FIG. 2 shows an example of a graphical user interface (GUI) 10 for such a monitoring system wherein images of hardware modules in a computing system chassis are shown. The GUI 10 may be generated by the UI control system 2 such as an information processing system configured according to an embodiment of the invention. Embodiments of the invention may be implemented utilizing an information processing system (such as shown in FIG. 8, described further below).

Figure 3:
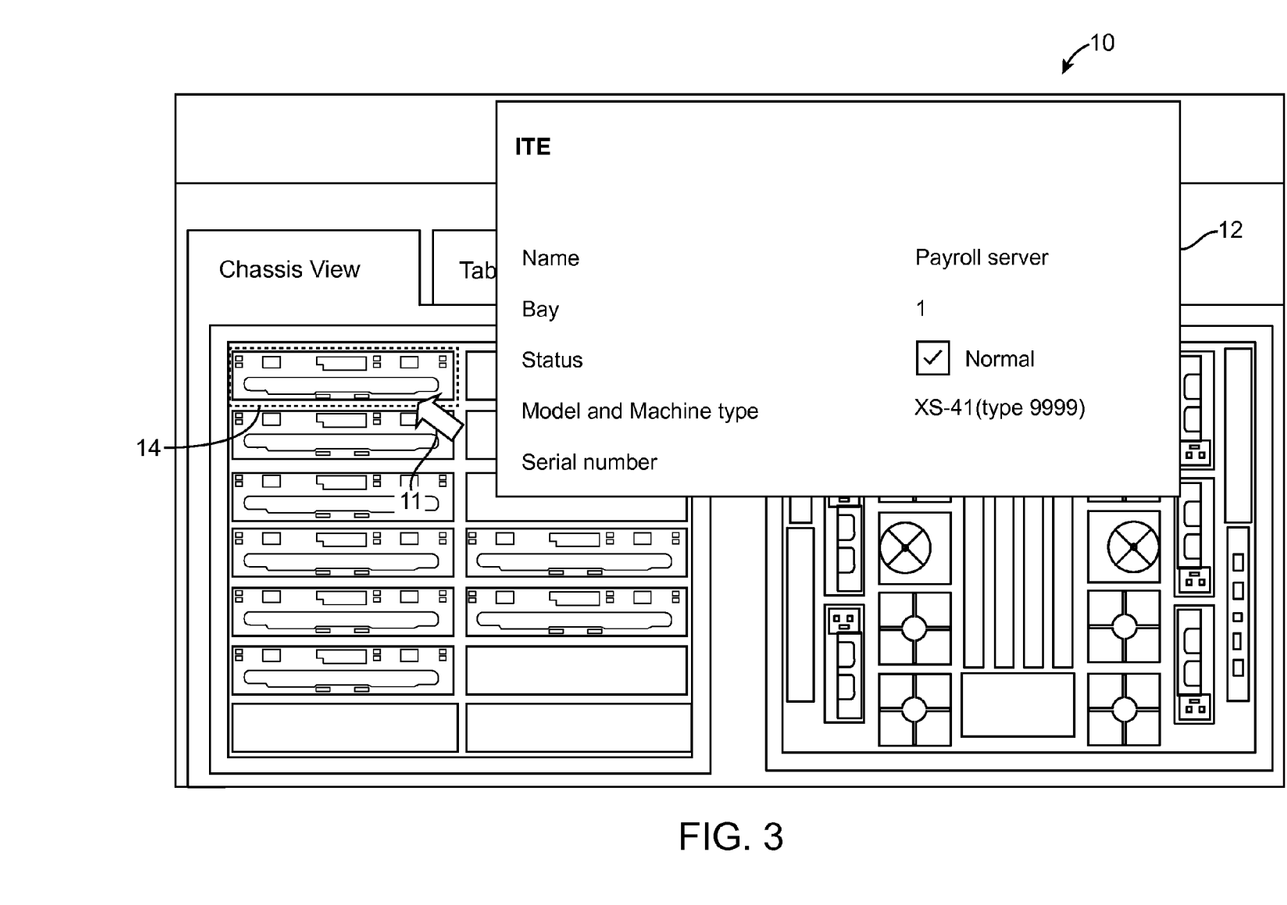
FIG. 3 illustrates the content presentation user interface of FIG. 2 and an on-demand user interface including a flyover popup window, according to one embodiment of the invention.

FIG. 3 shows a portion of the GUI 10 along with an on-demand user interface as a flyover popup (window) 12. As the user moves a pointer 11 (e.g., mouse pointer) over a module in the chassis represented by a GUI content element 14, a corresponding popup 12 appears after a delay (e.g., 600 msec) by the UI control system 2. In one example, the popup 12 displays information based on the GUI element 14.

In FIG. 3, the pointer 11 is hovering over the GUI content element 14 (e.g., hardware module representation) in an upper-left section of the GUI 10. In this example, the corresponding flyover popup 12 is overlaying, and as such covering, neighboring portions of the upper-left module in the GUI 10. The user may wish to view information under the popup 12 simultaneously while viewing the information in the popup 12 (e.g., viewing representation of a fan behind a hardware server module, viewing another hardware server immediately adjacent to the one under view, etc.).

The user can reposition the popup 12 simply without multiple actions such as moving a pointer, clicking, dragging the popup and unclicking. As shown in more detail in FIG. 4, the flyover popup 12 includes a bump zone 13 (FIG. 4) indicating that the target popup 12 is movable (affordance) when a pointer 11 is proximate (or in contact with) the bump zone 13. One implementation of moving a popup 12 comprises the UI control system 2 providing a user the ability to bump the flyover popup 12 out of the way using the bump zone 13. The user moves the pointer 11 to the bump zone 13 whereby the UI control system 2 bumps away the popup 12 (while remaining visible) with only a single, simple, and click-less pointer action required of the user.

Figure 4:
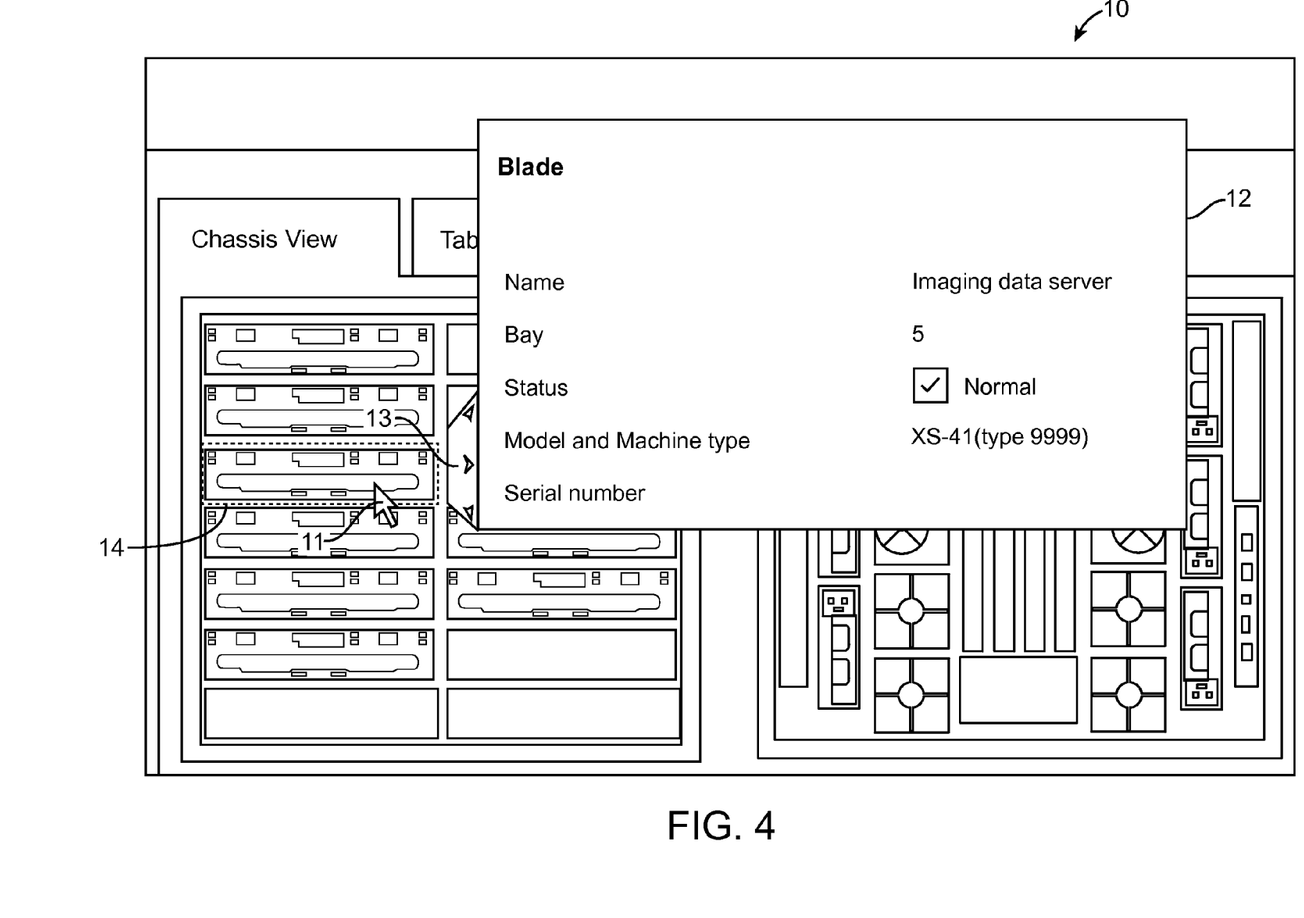
FIG. 4 illustrates the content presentation user interface of FIG. 3 and a flyover popup window including a bumper zone, according to another embodiment of the invention.

This feature allows on-demand user interfaces such as flyover popups to be used in more situations since they are easier for users to quickly move out of the way while still seeing them on the display screen. Multiple user actions are not required for moving the popup 12 out of the way. Rather, the user is involved in a click-less light weight interaction and need not move the pointer 11 far while the pointer 11 hovers over an area of interest. For example, the pointer 11 needs to be only moved to the closest edge of the popup 12, where the bump zone 13 (a bumper) is displayed. The lightweight characteristics of the bump match the overall lightweight characteristics of flyover popups, which themselves appear without a click.

In FIG. 4, when the user hovers the pointer 11 over a UI element 14 such as the third hardware module representation down on the left side of the GUI 10 that represents a hardware chassis, the UI control system 2 displays a popup 12 after a short delay. In this example, the bump zone 13 is part of the popup 12 on the lower left side of the popup 12, which also adjoins the right side of the UI element 14 being hovered over. The bump zone 13 provides the user the affordance to easily bump (move) the corresponding popup 12 out of the way.

Figure 5:
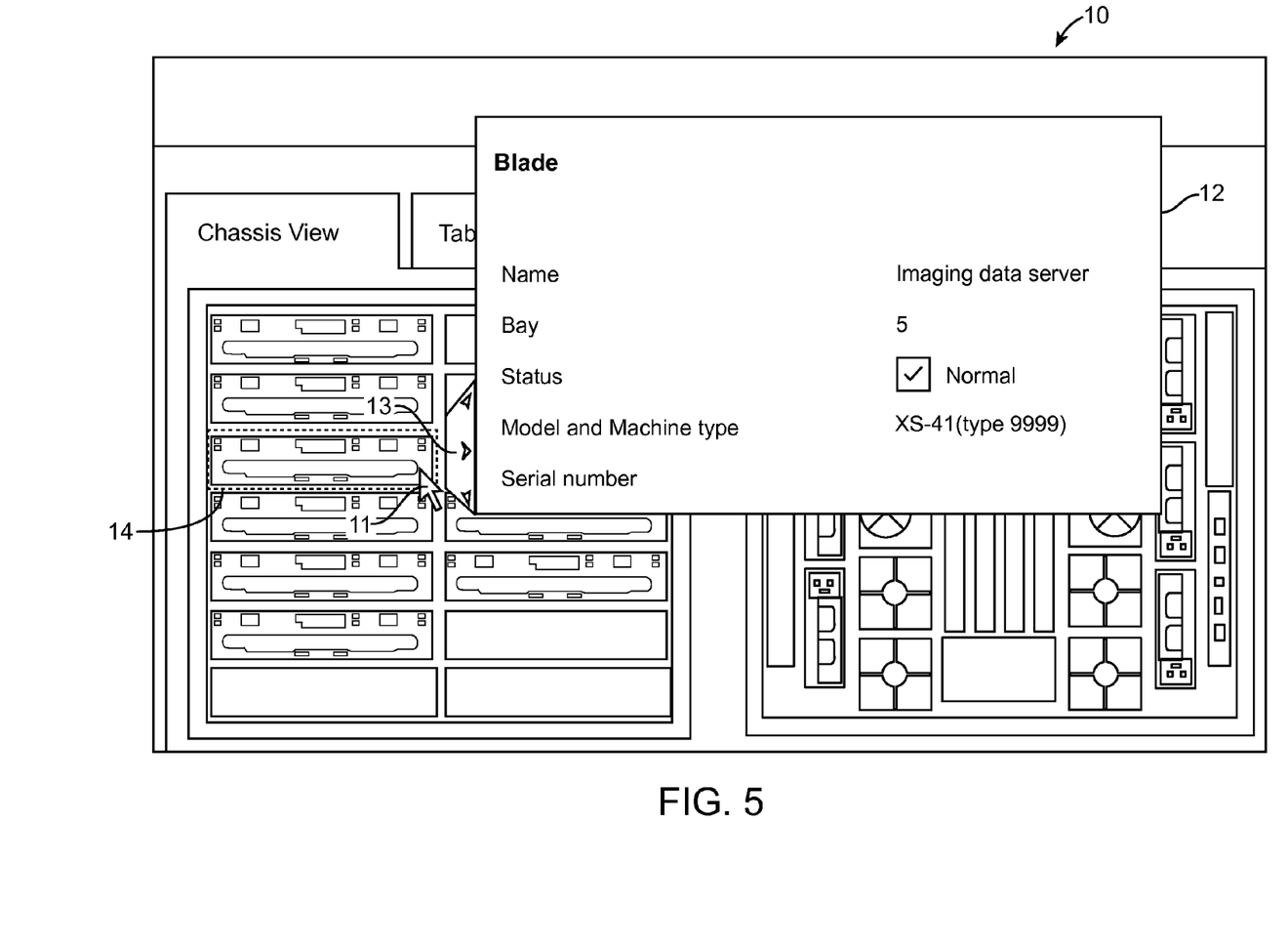
FIG. 5 illustrates the content presentation user interface of FIG. 4 and a flyover popup window including a bumper zone at the moment of pointer contact with the bumper zone, according to one embodiment of the invention.
Figure 6:
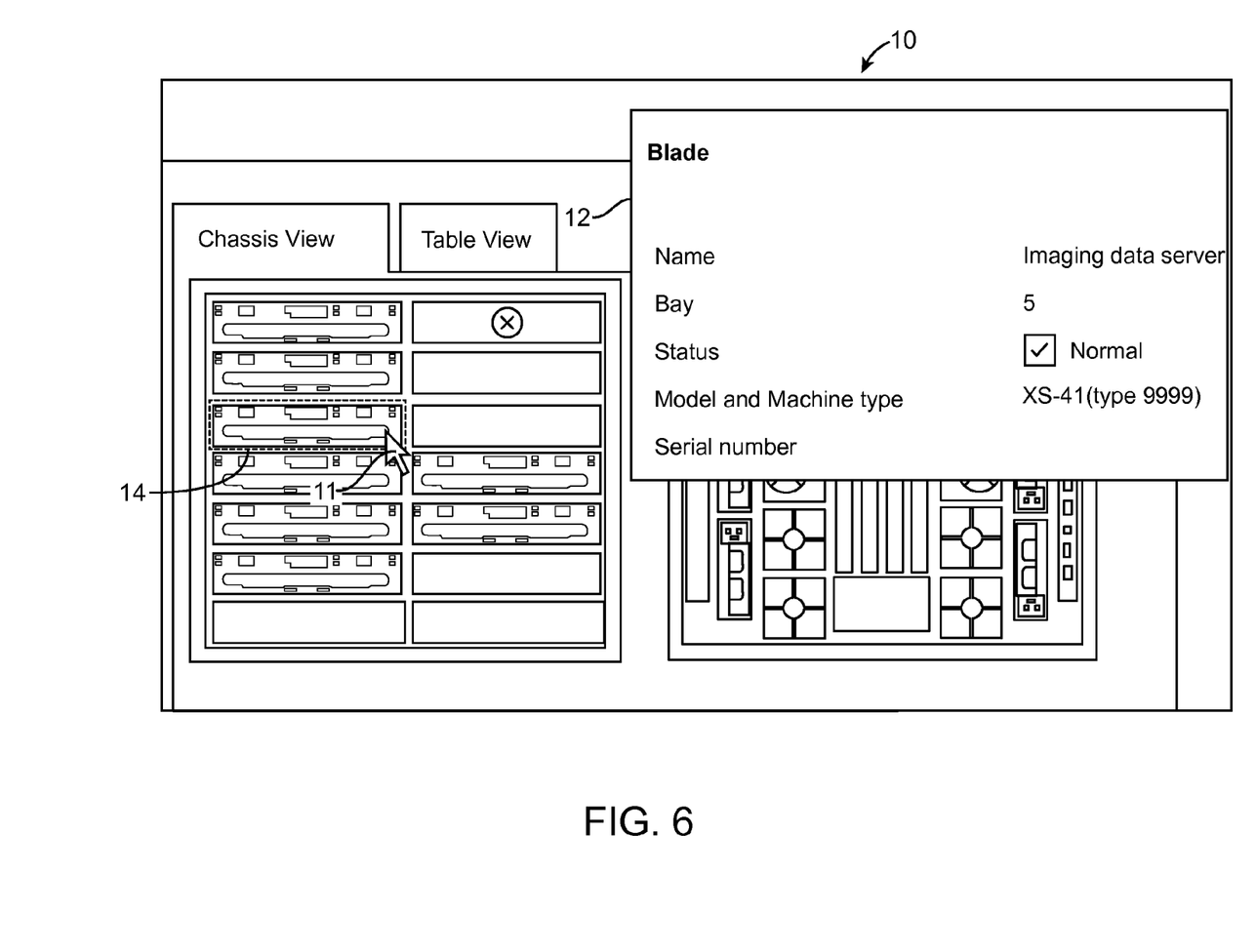
FIG. 6 illustrates the content presentation user interface of FIG. 5 and a flyover popup window bumped to a new location on the user interface, according to an embodiment of the invention.

FIG. 5 shows a sequence where the user has moved the pointer 11 closer to the popup 12 in the GUI 10, indicating initiation of a bump. FIG. 6 shows the popup 12 has been automatically bumped over by the UI control system 2 a distance to the side, wherein the user is now able see all elements representing other hardware in the front of the chassis. In another example, the names of the hardware module in the chassis may be displayed in the GUI 10. If the popup 12 is bumped (moved) further the user may also be able to see additional information (such as the rear-of-chassis modules) simultaneously with the popup 12.

Figure 7:
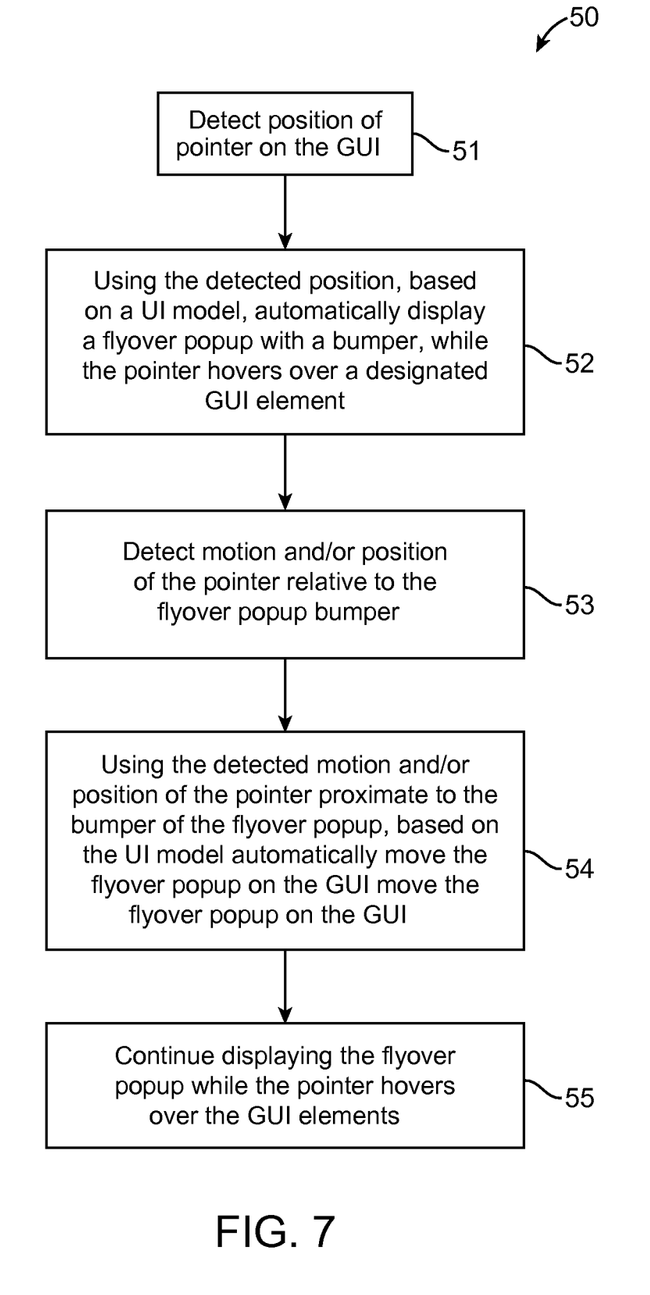
FIG. 7 illustrates a block diagram of a process for content presentation using on-demand user interfaces, according to an embodiment of the invention.

FIG. 7 shows a flowchart of a UI control process 50 for content presentation utilizing on-demand user interfaces such as flyover popups, using factors in a UI model, according to an embodiment of the invention. The UI control process 50 comprises the following process blocks:

Block 51: Detect position of pointer on the GUI.

Block 52: Using the detected position, based on the UI model, automatically display a flyover popup with a bumper, while the pointer hovers over a designated GUI element. The flyover popup includes a visual zone (bumper) whereby the popup can be moved. A designated GUI element may be, for example, an element in the GUI that has been previously designated as one with an associated flyover popup to be displayed while the pointer hovers over that GUI element.

Block 53: Detect motion and/or position of the pointer relative to the proximity of the flyover popup bumper.

Block 54: Using the detected motion and/or position of the pointer proximate to the bumper of the flyover popup, based on the UI model automatically transition (move) the flyover popup on the GUI.

Block 55: Continue displaying the flyover popup while the pointer hovers over the GUI elements.

In one embodiment of the invention, the transitional motion of a bumped popup 12 is a flowing or gradual motion from its current position C to a new position N in the GUI (rather than an instant motion from C to N), based on the UI model and detected position and motion of the pointer 11. During the motion, the popup 12 remains visible as it travels from a current position to a new position on the GUI. In one embodiment, the UI control system 2 determines a new position for a bumped popup 12 on the GUI based on several factors including detected position and motion of the pointer 11, size of the GUI, size of the popup 12, location of other windows (including popups) in the GUI, etc.

In another embodiment of the invention, the UI control system 2 includes a UI model wherein the UI control system 2 displays the bump zone 13 only if the user starts moving the pointer toward the popup 12, providing an intent-based bumper. This provides the GUI 10 a more streamlined look and feel, but with less preemptive affordance.

In another embodiment of the invention, the UI control system 2 includes a UI model wherein the user is afforded a level of control over movement behavior of the popup 12, such as the speed with which a popup 12 is moved (bumped), how far the popup 12 is moved, and the direction of motion of the popup 12. Transitioning the popup window to a new location on the graphical user interface comprises transitioning the popup window to a new location on the graphical user interface based on the motion (e.g., speed and/or acceleration) of the pointer relative to the bump zone 13, wherein the magnitude of the distance between the new location of the graphical user interface to a current position of the graphical user interface, is proportional to the motion (e.g., speed and/or acceleration) inter relative to the bump zone. For example, the quicker the user is moving the pointer 11 towards the popup 12 at the instant of the bump, the quicker and farther the popup 12 may move over on the GUI 10. As such, according to the UI model, the momentum of the pointer 11 at the time of pointer contact with the bump zone 13, maintains the movement of the popup 12 for a time period and/or distance, after the pointer contact.

In another embodiment, the UI control system 2 includes a UI model wherein the speed at which a popup 12 is moved has no impact on the movement speed and distance of the bump for the popup 12. In another embodiment, a UI model is provided wherein the UI control system 2 may automatically detect the best location to move (bump) the popup 12 based on the locations least likely to be relevant given the context.

In another embodiment, the UI control system 2 includes a UI model wherein the pointer 11 may meet a resistance point that keeps the pointer 11 bound to the flyover popup 12. As such, if the user "flicks" or "bumps" the popup 12, the pointer 11 would "feel" the popup as a resistance point and not leave the hover area over the GUI content element 14. This feature allows the popup 12 to continue being displayed and pointer 11 continues hovering over a UI element 14. The user bumped the popup 12 in order to continue viewing the popup 12, along with the UI elements the popup 12 was covering.

In another embodiment, the UI control system 2 includes a UI model wherein user control allows bumping a popup 12 in a controlled direction. The directional vector of the movement of the pointer 11 may correlate with the direction the popup 12 is moved by the UI control system 2. The movement direction may also be amplified, so that if the user is moving the pointer 11 downward at a 30 degree angle, the popup 12 may be bump off at double that angle, which would be a 60 degree angle.

In another embodiment, the UI control system 2 includes a UI model wherein the UI control system 2 has learning capability. For example, if popups were always bumped over to the side, the UI control system 2 may then begin to initially place popups farther over to where they are historically being bumped to.

In another embodiment, the UI control system 2 includes a UI model wherein the UI control system 2 keeps the bump zone 13 on the popup 12 post-bump in case the user desires to bump the popup 12 further. In one example, this feature utilizes a short delay period (e.g., 800 msec) to allow the user to move the pointer 11 to the bump zone 13 of the bumped popup 12 (while no longer hovering over the source GUI content element 14) to bump the popup 12 again and then move the pointer 11 back to hover over the source GUI content element 14.

In another embodiment of the invention, transitioning the popup window to a new location on the graphical user interface further comprises transitioning the popup window to a new location on the graphical user interface based on a combination of two or more of the above factors.

Embodiments of the invention can take the form of a computer simulation or program product accessible from a computer-usable or computer-readable medium providing program code for use by or in connection with a computer, processing device, or any instruction execution system. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 8 is a high level block diagram showing an information processing system 100 useful for implementing one embodiment of the present invention. The computer system 100 includes one or more processors, such as one or more processors 102. The processor 102 is connected to a communication infrastructure 104 (e.g., a communications bus, cross-over bar, or network).

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc., which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program package and package interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via a communication interface 124. Such computer programs, when run, enable the computer system to perform the features of the present invention as discussed herein. In particular, the computer programs, when run, enable the processor 102 to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of content presentation, comprising:
    detecting position of a pointer relative to a content element in a graphical user interface displayed on an electronic display screen;
    displaying a popup window at a location on the graphical user interface while the pointer hovers over the content element, wherein the popup window frame structure includes a bump zone that comprises a fixed visual bump zone graphical indicator displayed on an edge of the popup window frame structure indicating that the popup window is moveable away from the content element to another location on the graphical user interface;
    detecting proximity of the pointer relative to the edge of the popup window including the displayed bump zone while the pointer hovers over the content element; and
    selectively transitioning the popup window to a new location on the graphical user interface based on a user interface model and the detected proximity of the pointer relative to the edge of the popup window including the displayed bump zone.

2. The method of claim 1, wherein:
    displaying a popup window at a location on the graphical user interface further comprises:
        displaying the popup window at a location on the graphical user interface after a time period delay, while the pointer hovers over the content element.

3. The method of claim 2, wherein:
    detecting proximity of the pointer further comprises detecting motion of the pointer relative to the edge of the popup window including the bump zone based on movement of the pointer by the user; and
    transitioning the popup window to a new location on the graphical user interface further comprises transitioning the popup window to a new location on the graphical user interface further based on size of the graphical user interface and motion of the pointer relative to an edge of the popup window where the bump zone indicator is displayed.

4. The method of claim 3, wherein:
    transitioning the popup window to a new location on the graphical user interface further comprises automatically transitioning the popup window to a new location on the graphical user interface further based on direction of motion of the pointer proximate to the edge of the popup window including the bump zone, wherein the new location of the graphical user interface is on a trajectory based on a current location of the popup window and the direction of motion of the pointer.

5. The method of claim 3, wherein:
    transitioning the popup window to a new location on the graphical user interface further comprises transitioning the popup window to a new location on the graphical user interface further based on speed of the pointer relative to the edge of the popup window including the bump zone, wherein the magnitude of the distance between the new location of the graphical user interface to a current position of the graphical user interface, is proportional to the speed of motion of the pointer relative to the edge of the popup window including the bump zone.

6. The method of claim 3, wherein:
    transitioning the popup window to a new location on the graphical user interface further comprises transitioning the popup window to a new location on the graphical user interface further based on speed of the pointer relative to the edge of the popup window including the bump zone, wherein the magnitude of the distance between the new location of the graphical user interface to a current position of the graphical user interface is a fixed amount every time.

7. The method of claim 3, wherein:
    transitioning the popup window to a new location on the graphical user interface further comprises transitioning the popup window to a new location on the graphical user interface further based on acceleration of the pointer relative to the edge of the popup window including the bump zone, wherein the magnitude of the distance between the new location of the graphical user interface to a current position of the graphical user interface, is proportional to the acceleration of the pointer relative to the edge of the popup window including the bump zone.

8. The method of claim 3, wherein:
    transitioning the popup window to a new location on the graphical user interface further comprises transitioning the popup window to a new location on the graphical user interface based on one or more of: proximity of the pointer relative to the edge of the popup window including the bump zone, direction of motion of the pointer relative to the edge of the popup window including the bump zone and speed of motion of the pointer relative to the edge of the popup window including the bump zone.

9. The method of claim 3, wherein:
    transitioning the popup window to a new location on the graphical user interface further comprises the pointer meeting a resistance point that keeps the pointer bound to the popup window such that when the popup window is bumped by the pointer via the bump zone, the pointer reacts to the popup window as a resistance point while hovering over the content element.

10. The method of claim 3, further comprising:
    learning user preference by maintaining a history of the new location of each popup window, wherein transitioning a popup window to a new location further comprises transitioning the popup window to a new location based on that history.

11. The method of claim 3, further comprising:
    utilizing a delay period to allow the user to move the pointer to again bump the popup window, and then moving the pointer back to hover over the content element.

12. A computer program product for content presentation on an electronic display, comprising:
    a computer usable medium having computer readable program code embodied therewith, wherein the computer readable program code when executed on the computer causes the computer to perform operations comprising:
        detecting position of a pointer relative to a content element in a graphical user interface displayed on an electronic display screen;
        displaying a popup window at a location on the graphical user interface while the pointer hovers over the content element, wherein the popup window frame structure includes a bump zone that comprises a fixed visual bump zone graphical indicator displayed on an edge of the popup window frame structure indicating that the popup window is moveable away from the content element to another location on the graphical user interface;

detecting proximity of the pointer relative to the edge of the popup window including the displayed bump zone while the pointer hovers over the content element; and selectively transitioning the popup window to a new location on the graphical user interface based on factors of a user interface model and the detected proximity of the pointer relative to the edge of the popup window including the displayed bump zone.

13. The computer program product of claim 12, wherein the program code further causes the computer to perform operations further comprising:

displaying the popup window at a location on the graphical user interface after a time period, while the pointer hovers over the content element;

detecting motion of the pointer relative to the edge of the popup window including the bump zone based on movement of the pointer by the user; and automatically transitioning the popup window to a new location on the graphical user interface further based on size of the popup window and motion of the pointer proximate to the edge of the popup window including the bump zone.

14. The computer program product of claim 13, wherein the program code further causes the computer to perform operations further comprising:

transitioning the popup window to a new location on the graphical user interface further based on one or more of:

direction of motion of the pointer relative to the edge of the popup window including the bump zone, wherein the new location of the graphical user interface is on a trajectory based on a current location of the popup window and the direction of motion of the pointer;

speed of the pointer relative to the edge of the popup window including the bump zone, wherein the magnitude of the distance between the new location of the graphical user interface to a current position of the graphical user interface, is proportional to the speed of motion of the pointer relative to the edge of the popup window including the bump zone; and acceleration of the pointer relative to the edge of the popup window including the bump zone, wherein the magnitude of the distance between the new location of the graphical user interface to a current position of the graphical user interface, is proportional to the acceleration of the pointer relative to the edge of the popup window including the bump zone.

15. The computer program product of claim 13, wherein the program code further causes the computer to perform operations further comprising:

the pointer meeting a resistance point that keeps the pointer bound to the popup window such that when the popup window is bumped by the pointer via the bump zone, the pointer reacts to the popup window as a resistance point while hovering over the content element.

16. The computer program product of claim 13, wherein the program code further causes the computer to perform operations further comprising:

learning user preference by maintaining a history of the new location of each popup window, wherein transitioning a popup window to a new location further comprises transitioning the popup window to a new location based on that history.

17. The computer program product of claim 13, wherein the program code further causes the computer to perform operations further comprising:

utilizing a delay period to allow the user to move the pointer to again bump the popup window, and then moving the pointer back to hover over the content element.

18. A system for content presentation on an electronic display, comprising:

a user interface control processor configured for detecting position of a pointer relative to a content element in a graphical user interface displayed on an electronic display screen, displaying a popup window at a location on the graphical user interface while the pointer hovers over the content element, wherein the popup window frame structure includes a bump zone that comprises a fixed a visual bump zone graphical indicator displayed on an edge of the popup window frame structure indicating that the popup window is moveable away from the content element to another location on the graphical user interface, detecting proximity of the pointer relative to the edge of the popup window including the displayed bump zone while the pointer hovers over the content element, and selectively transitioning the popup window to a new location on the graphical user interface based on a user interface model and the detected proximity and movement of the pointer relative to the edge of the popup window including the displayed bump zone based on movement of the pointer by the user.

19. The system of claim 18, wherein the user interface control processor is further configured for:

displaying the popup window at a location on the graphical user interface after a time period, while the pointer hovers over the content element;

detecting motion of the pointer relative to the edge of the popup window including the bump zone based on movement of the pointer by the user; and automatically transitioning the popup window to a new location on the graphical user interface based on one or more of:

direction of motion of the pointer relative to the edge of the popup window including the bump zone, wherein the new location of the graphical user interface is on a trajectory based on a current location of the popup window and the direction of motion of the pointer;

speed of the pointer relative to the edge of the popup window including the bump zone, wherein the magnitude of the distance between the new location of the graphical user interface to a current position of the graphical user interface, is proportional to the speed of motion of the pointer relative to the edge of the popup window including the bump zone; and acceleration of the pointer relative to the edge of the popup window including the bump zone, wherein the magnitude of the distance between the new location of the graphical user interface to a current position of the graphical user interface, is proportional to the acceleration of the pointer relative to the edge of the popup window including the bump zone.

20. The system of claim 18, wherein the user interface control processor is further configured for:

learning user preference by maintaining a history of the new location of each popup window, wherein transitioning a popup window to a new location further comprises transitioning the popup window to a new location based on that history; and utilizing a delay period to allow the user to move the pointer to again bump the popup window, and then moving the pointer back to hover over the content element.

\* \* \* \* \*